R. HOFMEISTER.
ELECTRIC IGNITER FOR GAS STOVES.
APPLICATION FILED FEB. 9, 1909.
933,450.
Patented Sept. 7, 1909.
2 SHEETS—SHEET 1.
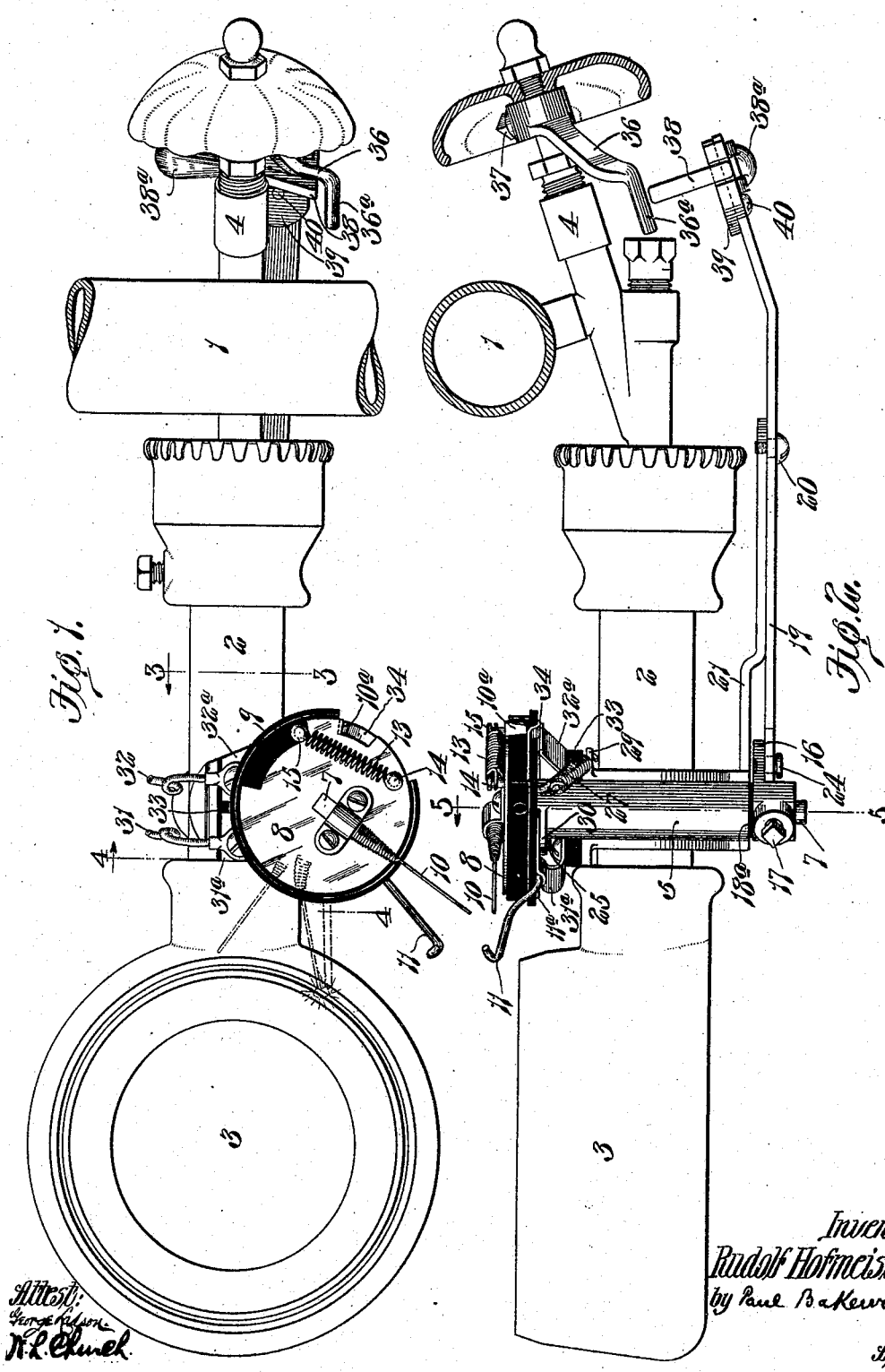

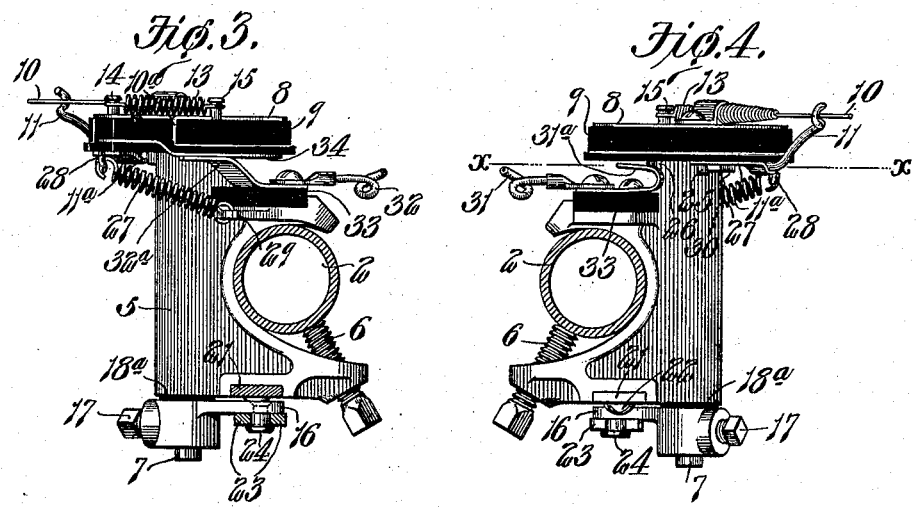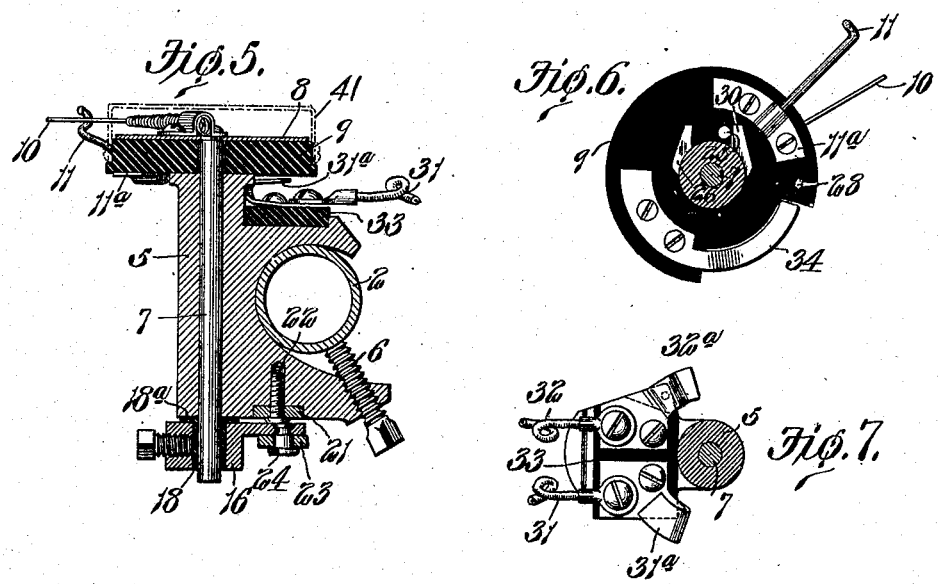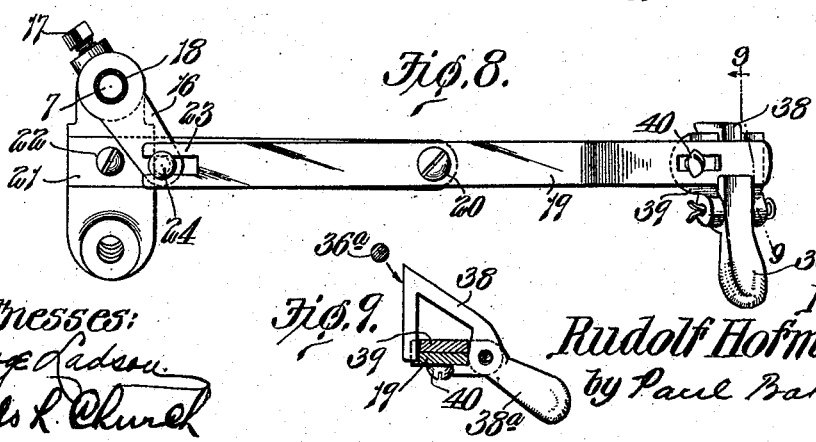

UNITED STATES PATENT OFFICE.

RUDOLF HOFMEISTER, OF ST. LOUIS, MISSOURI, ASSIGNOR OF ONE-HALF TO JOHN P. CASEY AND ONE-FOURTH TO LOUIS C. PAUSCH, OF ST. LOUIS, MISSOURI.

ELECTRIC IGNITER FOR GAS-STOVES.

933,450.      Specification of Letters Patent.      Patented Sept. 7, 1909.

Application filed February 9, 1909. Serial No. 476,942.

*To all whom it may concern:*

Be it known that I, RUDOLF HOFMEISTER, a citizen of the United States, residing at St. Louis, Missouri, have invented a certain new and useful Improvement in Electric Igniters for Gas-Stoves, of which the following is a full, clear, and exact description, such as will enable others skilled in the art to which it appertains to make and use the same.

This invention relates to electric igniters, such as are used on gas burners and similar apparatuses.

One object of my invention is to provide an improved electric igniter which is so constructed that the electrodes and other movable parts are normally completely disconnected from the battery or other source of electrical supply.

Another object is to provide an electric igniter which is completely insulated from the gas burner or apparatus with which it is used.

Another object is to provide an electric igniter of simple construction that can be installed easily on gas stoves and which can be used with various types of gas valves, cocks or keys.

Another object is to provide an electric igniter for stove burners which is so constructed that it will not be damaged in case the substance being cooked or heated overflows or spills on same. And still another object of my invention is to provide a gas stove burner electric igniter of simple construction that will automatically ignite the gas when the gas-controlling valve is turned on.

Other objects and desirable features of my invention will be hereinafter pointed out.

Figure 1 of the drawings is a top plan view of one of the top burners of a gas stove with my improved electric igniter applied thereto, the cap which covers the movable parts of the igniter being removed so as to more clearly show the construction of the igniter; Fig. 2 is a side elevational view of the parts shown in Fig. 1; Fig. 3 is a vertical sectional view taken on approximately the line 3—3 of Fig. 1 looking in the direction of the arrow; Fig. 4 is a vertical sectional view taken on approximately the line 4—4 of Fig. 1 looking in the direction of the arrow; Fig. 5 is a vertical sectional view taken on approximately the line 5—5 of Fig. 2 looking in the direction of the arrow; Fig. 6 is a horizontal sectional view taken on approximately the line X—X of Fig. 4 looking upwardly; Fig. 7 is a horizontal sectional view taken on approximately the line X—X of Fig. 4 looking downwardly; Fig. 8 is a bottom plan view of the operating lever of the igniter; and Fig. 9 is a detail view of the gravity pawl on the outer end of said lever, said view being taken on approximately the line 9—9 of Fig. 8.

I have herein shown my improved electric igniter applied to one of the top burners of a gas stove.

Referring to the drawings which illustrate the preferred form of my invention, 1 designates the gas supply pipe that extends along the front of the stove adjacent the top thereof, and 2 designates the burner pipe that leads from said supply pipe to one of the top burners 3 of the stove.

The stove herein shown is provided with a screw valve 4 for controlling the supply of gas but I wish it to be understood that my igniter could be used equally well with various other types of valves or cocks.

The igniter comprises a support 5 provided with jaws that embrace or partially surround the burner pipe 2, and a set screw 6 is adjustably mounted in one of said jaws for engaging said burner pipe 2 so as to securely hold the igniter in position. A vertical shaft 7 that is mounted in the support 5 has a metal plate 8 rigidly connected to its upper end, and a plate 9 of fiber or some other suitable insulating material, is loosely mounted on said shaft between the plate 8 and the upper end of the support 5, as shown clearly in Fig. 5. The metal plate 8 carries an electrode or contact 10 that preferably consists of a piece of resilient wire, and the plate 9 of insulating material is also provided with an electrode or contact 11 with which the electrode 10 coöperates so as to produce an electric spark that ignites the gas when the gas-controlling valve is turned on. A coiled contraction spring 13 is connected at one end to a pin 14 on the upper side of the metal plate 8 and at its opposite end to a pin 15 on the plate 9 of insulating material, the metal plate 8 being provided in its periphery with a notch or cut-out portion, as shown in Fig. 1, that permits said plate 8 to move relatively to the plate 9, as hereinafter described.

An arm 16 is adjustably connected to the lower end of the shaft 7 by means of a set screw 17, and said arm is preferably insulated from the shaft 7 by means of a collar or sleeve 18 of some suitable insulating material, said sleeve being provided at its upper end with a flange 18ª that lies between the lower side of the support 5 and the upper side of the arm 16 so as to insulate said parts from each other.

An operating lever 19 is pivotally connected at 20 to a bracket or support 21 that projects laterally from the support 5, the inner end of said bracket being connected to said support by a screw 22, as shown in Fig. 5. It will be obvious, however, that the bracket 21 could be formed integral with the support 5 or connected thereto in various other ways than that herein shown without departing from the spirit of my invention. The inner end of the operating lever 19 is bifurcated so as to form jaws 23, as shown clearly in Fig. 8, that embrace a pin or projection 24 on the under side of the arm 16 which is connected to the lower end of the shaft 5 so as to impart an oscillating movement to said shaft whenever the lever 19 is operated.

The electrodes or contacts 10 and 11 are arranged in such a position that they will normally lie some distance from the burner 3, as shown in full lines in Fig. 1, but when the operating lever 19 is automatically actuated by the gas-controlling valve 4, as hereinafter described, said contacts will first be moved into a position adjacent the burner 3, as shown in dotted lines in Fig. 1, and the yielding electrode 10 will thereafter wipe past the electrode 11 so as to produce an electric spark which ignites the gas that flows from said burner. In view of the fact that the metal plate 8 is rigidly connected to the shaft 7 said plate will move with said shaft whenever it is oscillated by the lever 19, and as the plate 9 of insulating material is connected to the plate 8 by the coiled spring 13, said plate 9 will move with the plate 8 until a pin 25 on the under side of the plate 9 strikes a stationary stop 26 on the support 5, as shown clearly in Figs. 4 and 6. The stop 26 is so disposed that the electrodes will move over the burner 3, as shown in dotted lines in Fig. 1, before the pin 25 on the plate 9 strikes said stop. After said pin has engaged said stop the plate 9, which carries the electrode 11, will remain at rest and thus cause the yielding electrode 10 on the metal plate 8 to wipe past same and produce an electric spark. The shaft 7 and also the operating lever 19 are returned to normal position by means of a contraction spring 27 connected at one end to a hook or projection 28 on the under side of the plate 9 of insulating material, and at its opposite end to a lug 29 on the support 5, as shown in Fig. 3, the normal position of said movable parts being determined by a stop 30 on the support 5 that coöperates with the pin 25 on the under side of the plate 9.

The electric wires 31 and 32 that supply the current to the electrodes lead from a battery or other suitable source of electrical energy, not shown, and are connected to spring contacts 31ª and 32ª mounted on a block 33 of insulating material carried by the support 5, as shown in Figs. 3, 4 and 5. The spring contact 31ª is engaged by a contact 11ª to which the electrode 11 is connected whenever the plate 9 is oscillated, and the spring contact 32ª coöperates with a contact 34 connected to the under side of the plate 9 of insulating material and adapted to be engaged by a depending arm 10ª on the metal plate 8 whenever said plate is oscillated. This depending arm 10ª is so disposed that it is normally out of engagement with the contact 34 with which the spring contact 32ª coöperates, and as the contact 11 is normally out of engagement with the spring contact 31ª, the electrodes will normally be completely disconnected from the battery or source of electrical supply that energizes said electrodes. When the operating lever 19 is moved the shaft 7 will be oscillated and thus impart movement to the plates 8 and 9 which causes the contact 11ª on the plate 9 to move into engagement with the spring contact 31ª, and the depending arm 10ª to move into engagement with the contact 34 with which the spring contact 32ª coöperates, thereby energizing the electrodes so that an electric spark will be produced when the electrode 10 wipes past the electrode 11.

The means herein shown for transmitting the movement of the gas-controlling valve 4 to the operating lever 19, consists of an arm 36 adjustably connected to the stem of said valve by a set screw 37, and provided with an extension 36ª that is adapted to engage a weighted pawl 38 mounted on the outer end of said operating lever when the valve 4 is moved in the direction to turn on the gas. The pawl 38 has a heavy extension 38ª that normally holds the upper end of the pawl in such a position that it will be engaged by the extension 36ª which moves in the direction of the arrow in Fig. 9 when the gas-controlling valve is moved to turn on the supply of gas. When said valve is moved in the opposite direction to cut off the flow of gas to the burner the extension 36ª strikes the upper inclined surface on the pawl 38 and rocks it on its fulcrum, thus permitting said extension to pass by same. The pawl 38 is preferably connected to the operating lever in such a manner that it can be adjusted relatively to same so as to arrange said pawl in the proper position, and in the construction herein shown the pawl 38 is pivotally connected to a plate 39 provided with an elongated slot, as shown in Fig. 8, through which a screw 40 passes to connect said plate to the lever.

As shown in broken lines in Fig. 5, a cap 41 is connected to the plate 9 of insulating material so as to completely incase said plate, the top plate 8, and the springs and other parts that coöperate with said plates, said cap, of course, being provided at one side with a slot through which the electrodes project. By constructing the device in this manner I eliminate the possibility of its being damaged by food that boils over or spills onto same for the cap 41 covers all of the movable parts of the igniter except the operating lever.

An electric igniting device of the construction above described can be installed quickly as it is retained in position by the set screw 6 that engages the burner pipe 2. The movable plates 8 and 9 and also the shaft 7 are insulated from the support 5 so that the electrodes are insulated from the stove on which the igniter is used. Furthermore, the electrodes are normally completely disconnected from the source of electrical energy as the contacts on the plates 8 and 9 are separated from the spring contacts to which the conducting wires are connected when the operating lever is in its normal position.

Another desirable feature of my improved igniter is that the electrodes normally lie far enough away from the burner to prevent the flame from coming in contact with same. And still another very desirable feature of my igniter is that it will not be damaged in case the substance being cooked on the burner boils over or spills on the igniter for the cap 41 completely incases the plates 8 and 9 and the springs and other parts that coöperate therewith.

Having thus described the invention, what is claimed as new and desired to be secured by Letters Patent is:

1. An electric igniter comprising a pair of electrodes, contacts which are connected to a source of electrical energy and normally separated from the electrode contacts, and means for moving the electrode contacts into engagement with the contacts which are connected to the source of electrical energy.

2. An electric igniter comprising a pair of electrodes which normally lie out of the path of the flame of the burner with which the igniter is used, contacts connected to a source of electrical energy and normally separated from said electrodes, and means for shifting the electrodes into a position adjacent the burner and also into engagement with said contacts.

3. An electrical igniter comprising a pair of movable members, an electrode connected to each of said members, said electrodes normally lying in such a position that they are out of the flame of the burner on which the igniter is used, contacts connected to a source of electrical energy and normally separated from said electrodes, and means for moving both of said members for a certain distance to bring the electrodes adjacent the burner and into position to be energized by said contacts, and thereafter cause one member to move relatively to the other and thus cause the electrodes thereon to produce a spark.

4. An electric igniter comprising a pair of members each of which is provided with an electrode, means for positively moving one of said members, a yielding device separate and distinct from said electrodes for connecting said members together so as to cause the positively moved member to actuate the other, and means for arresting one of said members while the other continues to move so as to cause the electrodes thereon to form a spark.

5. An electric igniter comprising a pair of members each of which is provided with an electrode, means for moving one of said members, a spring separate and distinct from said electrodes for connecting said members together so as to cause them to move simultaneously for a certain distance, and a stop arranged in the path of a projection on one of said members for arresting the movement thereof before the other member has reached its limit of movement, thus causing the electrodes on said members to wipe past each other and form a spark.

6. An electric igniter, comprising a support, means on said support for connecting it to the burner pipe of a stove, a shaft journaled in said support and provided with a member that carries an electrode, a coöperating member loosely mounted on said shaft and provided with an electrode, an operating lever for actuating said shaft, yielding means for causing both of said members to move simultaneously for a certain distance, and means for causing one of said members to come to rest while the other continues to move so as to cause the electrodes to produce a spark.

7. An electric igniter comprising a support, a shaft journaled in said support and provided at its upper end with a metal plate to which an electrode is connected, a plate of insulating material mounted on said shaft and arranged between said metal plate and the upper end of said support, a coöperating electrode on said plate of insulating material, means for actuating said shaft, and means for causing the plate of insulating material to move with said metal plate for a certain distance and then come to rest.

8. An electric igniter comprising a support, contacts insulated from said support and connected to supply wires, a pair of coöperating electrodes, and means coöperating with said contacts for energizing said electrodes.

9. An electric igniter, comprising a pair of coöperating electrodes, mechanism for actuating said electrodes to produce a spark comprising an operating lever, means operated by said lever for imparting movement to the electrodes, a device adjustably connected to said lever, and means connected to the stem of a gas-controlling valve and coöperating with said device for imparting movement to the lever.

10. An electric igniter for gas stoves comprising a support, a shaft journaled in said support and provided at its upper end with an electrode, a member loosely mounted on said shaft and provided with a coöperating electrode, means for operating said shaft and member to bring the electrodes into engagement with each other and thus produce a spark, and means for insulating said shaft and both of said electrodes from the support.

11. An electric igniter for gas burners, comprising a support provided with means for connecting it to the member that carries the burner with which the igniter is used, a shaft journaled in said support and provided at its lower end with an arm, an operating lever pivotally connected to a bracket on the support and provided with a bifurcated jaw that receives a projection on said arm, and electrodes that coöperate with each other to produce a spark when said shaft is turned.

12. An electric igniter for gas burners, comprising a support provided with means for connecting it to the member that carries the burner with which the igniter is used, a shaft journaled in said support and provided at its lower end with an arm, an operating lever pivotally connected to a bracket on the support and provided with a bifurcated jaw that receives a projection on said arm, an electrode-carrying member loosely mounted on the upper end of said shaft, an electrode-carrying member rigidly connected to said shaft, and means for causing said electrode-carrying members to move simultaneously for a certain distance.

13. An electric igniter comprising a pair of superimposed members, one of which is formed of metal and the other of insulating material, coöperating electrodes carried by said members, means for moving said members relatively to each other to cause the electrodes to produce a spark, contacts connected to a source of electrical energy, and means coöperating with said contacts for causing the electrodes to be energized when the electrode-carrying members reach a certain position.

14. An electric igniter comprising a pair of members, electrodes carried by said members, means for actuating said members to cause the electrodes to engage each other and thus produce a spark, and a cap connected to one of said electrode-carrying members and provided with an opening through which the electrode on the other member projects.

15. An electric igniter comprising a support, a shaft journaled in said support and provided at its upper end with a metal member to which an electrode is connected, a non-conducting member provided with an electrode and arranged under said metal member, means for oscillating said shaft, means for causing said non-conducting member to move with the shaft for a certain distance and then come to rest so that said electrodes will coöperate with each other to produce a spark, and means for insulating said shaft from the support.

16. An electric igniter comprising contacts that are connected to a source of electrical energy, a pair of members provided with coöperating electrodes, contacts on said members that are disconnected from the contacts first referred to when the electrode-carrying members are in their normal position, and means for actuating said members to move said coöperating contacts into engagement with each other and thus energize the electrodes.

17. An electric igniter comprising a support provided with insulated contacts that are connected to a source of electrical energy, a shaft journaled in said support, an operating lever connected to said shaft, means for insulating said lever from the shaft and the support, a plate of insulating material loosely mounted on the upper end of said shaft and resting on said support, a metal plate connected to said shaft and arranged above said insulating plate, coöperating electrodes carried by said plates, a yielding connection between said plates, and means for preventing the plate of insulating material from moving as great a distance as the metal plate so that one of said contacts will wipe past the other and thus produce a spark.

18. An electric igniter comprising a support provided with insulated contacts that are connected to a source of electrical energy, a shaft journaled in said support, an operating lever connected to said shaft, means for insulating said lever from the shaft and the support, a plate of insulating material loosely mounted on the upper end of said shaft and resting on said support, a metal plate connected to said shaft and arranged above said insulating plate, coöperating electrodes carried by said plates, a yielding connection between said plates, a projection on the plate of insulating material that engages a stationary stop after said plate has moved a certain distance so as to arrest the movement of said plate, and contacts on said plates that engage the contacts which are connected to the source of electrical energy when said plates are actuated.

19. An electric igniter for gas burners, comprising coöperating electrodes, an operating lever, means for causing said electrodes to produce a spark when said lever is moved, a weighted pawl on said lever, and a device on the gas-controlling valve of the burner that is adapted to engage said pawl and thus impart movement to the operating lever when the gas valve is turned on, said pawl having an inclined surface which said device engages when it is returned to normal position.

20. In combination, a gas burner, a valve for controlling the flow of gas to said burner, coöperating electrodes that normally occupy a position at one side of said burner, an operating lever for causing said electrodes to move toward the burner and relatively to each other to produce a spark, a device adjustably connected to said lever, and a coöperating device adjustably connected to the stem of the gas valve for transmitting the movement of said stem to said lever.

21. In an electric igniter, an oscillating plate of non-conducting material provided with an electrode, a metal plate arranged above same and provided with an electrode, a stop on the upper side of the non-conducting plate that travels in a notch or cut-off portion in the metal plate, a spring connecting said plates, means for positively moving the metal plate, and a stationary stop that is adapted to be engaged by a projection on the non-conducting plate so as to hold it at rest while the metal plate continues to move.

In testimony whereof I hereunto affix my signature in the presence of two witnesses, this sixth day of February 1909.

RUDOLF HOFMEISTER.

Witnesses:
WELLS L. CHURCH,
GEORGE BAKEWELL.